United States Patent [19]
Takehisa et al.

[11] 3,714,008
[45] Jan. 30, 1973

[54] INHIBITORS FOR AQUEOUS PHASE, RADIATION POLYMERIZATION

[75] Inventors: Masaaki Takehisa; Shiro Senrui, both of Takasaki-shi, Japan

[73] Assignee: Japan Atomic Energy Research Institute, Minato-ku, Tokyo, Japan

[22] Filed: May 12, 1970

[21] Appl. No.: 36,682

[52] U.S. Cl. ...................... 204/159.22, 260/29.6 XA
[51] Int. Cl. ............................ C08d 1/00, C08f 1/16
[58] Field of Search.....................204/159.22, 159.15

[56] References Cited

UNITED STATES PATENTS 3,058,899  10/1962  Yanko et al. ..................... 204/159.22
3,008,920  11/1961  Urchick ........................... 204/159.15

OTHER PUBLICATIONS

Bovey et al., Emulsion Polymerization, Interscience Pub., 1955, pp. 233–236

Primary Examiner—Murray Tillman
Assistant Examiner—Richard B. Turer
Attorney—Stevens, Davis, Miller & Mosher

[57] ABSTRACT

In the polymerization, in which an aqueous phase is employed, of ethylene, or ethylene and other unsubstituted or substituted olefinic monomers by means of an ionizing radiation, formation of an undesirable polymer in the aqueous phase of the reaction system is inhibited by using specific polymerization inhibitors. The inhibitors which have no adverse effect on the polymerization in the non-aqueous phase, comprise the electrolytes which have strong oxidizing action and/or react at high reaction rate with active species such as H radicals, OH radicals and/or hydrated electrons formed by ionizing radiation. According to the present invention, adhesion of undesirable polymer to the reactor walls during polymerization reaction is prevented and contamination which lowers the quality of the main polymer is eliminated.

7 Claims, No Drawings

INHIBITORS FOR AQUEOUS PHASE, RADIATION POLYMERIZATION

BACKGROUND OF THE INVENTION

The technique of polymerizing a monomer or monomers by dispersing said monomers in water or aqueous solution is widely employed industrially in the field of emulsion polymerization or suspension polymerization. Such dispersion polymerization makes it easy to control the polymerization temperature and, further, any difficulty in operation that might arise owing to increase in viscosity during the polymerization is removed. However, undesirable polymer is formed in the water or aqueous solution phase, when a gas-liquid or liquid-liquid mixed phase system in which the polymerizable monomer phase consists of ethylene, ethylene and another olefinic monomer, or a mixture of said monomer and its organic solvent or diluent and coexists with water or aqueous solution phase, is irradiated by an ionizing radiation. In such a mixed phase polymerization system, the inhibition of polymerization in the medium phase such as water or aqueous solution phase is very useful for inhibiting formation of the undesirable polymer derived from the monomer dissolved in the aqueous phase and adhesion thereof to the reactor walls, and further avoiding the lowering of quality of the main polymer which would result by being mixed with said undesirable polymer.

Some chemicals which inhibit polymerization reaction have been known; for example, diphenylpicrylhydrazil (D.P.P.H.) is a stable radical per se, and benzoquinone and nitrobenzene etc. are chemicals which form stabilized radicals by reacting with propagating radicals. However, such polymerization inhibitors do not selectively inhibit polymerization in the aqueous phase, and adversely inhibit the desired polymerization reaction in the nonaqueous monomer phase or the overall reactions in the polymerization system, since these inhibitors are non-ionic organic compounds.

SUMMARY OF THE INVENTION

The present invention relates to a novel polymerization process for polymerizing ethylene or a mixture of ethylene and other unsubstituted or a substituted olefinic monomer or monomers. Particularly, it relates to an improvement in polymerization process which comprises using polymerization inhibitors which inhibit or control specifically the polymerization in water or aqueous solution phase and have no adverse effect on the polymerization in the monomer phase, when the polymerization reaction by means of an ionizing radiation is carried out in the gas-liquid or liquid-liquid mixed phase system comprising water or an aqueous solution phase and a polymerizable component phase consisting of ethylene, or mixture of ethylene and other polymerizable monomer or monomers, or mixture of said monomer and its solvent or diluent. The term "an aqueous solution phase" means a solution phase comprising water and an organic medium such as a lower alkanol which has been employed in the conventional polymerization processes.

The inventors studied a series of inorganic and ionic organic compounds which are selectively distributed in the aqueous phase in the mixed phase polymerization reaction of ethylene or ethylene and other olefinic monomers by means of an ionizing radiation, and found that formation of undesirable polymer in aqueous phase is entirely eliminated or remarkably decreased by dissolving one or more chemicals selected from the inhibitors as defined below in the water or aqueous solution phase. Thus, the present invention was completed.

The inhibitors employed in the present invention are (A) the electrolytes which have strong oxidizing action and release nascent oxygen in an ordinary chemical reaction condition, or (B) those which react at a high reaction rate with active species such as H radicals, OH radicals and/or hydrated electrons etc. that formed in the aqueous phase by means of an ionizing radiation and are transformed into stable chemical species by reacting therewith. An inhibitor of (A) group may have the properties of the inhibitor of (B) group and vice versa, however, the following exemplified compounds are classified according to their main properties. The inhibitors (A) typically include bichromates, permanganates and persulfates; inhibitors (B) include nitrates, nitrites, ferric-cyanates, ferro-cyanates, ferric salts, stannic salts, thiosulfates, dithionates, alkalihalides, carbonates as well as phosphonic acid, sulfuric acid, lower organic carboxylic acids and salts of these acids.

By adding a small amount of one or more chemicals selected from the above inhibitors to water or aqueous solution phase prior to the polymerization reaction, the inventors succeeded in eliminating or remarkably decreasing the formation of undesirable polymer in said aqueous solution, in preventing adhesion of said undesirable polymer to the reactor walls, and in preventing the lowering of quality of the main desired polymer which ordinarily results when the polymer mixes with said undesirable polymer. The amount of the inhibitor to be added need not be controlled strictly, but in general, preferably ranges from $10^{-4}$ to $10^{-1}$ mol per liter of water or aqueous solution. It is not desirable to add a large excess of the inhibitor since this necessitates a recovery operation, increases the cost of the operation, and might lower the purity of the product. As shown in Example 1, addition of the inhibitor in excess has little effect on the amount of the polymer formed in the aqueous phase.

The inhibitor can be added to the aqueous phase at any stage of the operation before initiating polymerization reaction, by dissolving it in water or aqueous solution phase. The radiation employed in the present invention is an ionizing radiation known to the art such as gamma rays, X-rays, beta rays, electron beams, neutron beams, alpha rays and mixture thereof etc.

In the present invention, the term "an olefinic monomer" means a polymerizable olefinic monomer such as an olefin other than ethylene, a vinyl compound and the other substituted monomers of an olefin. Such a polymerizable monomer can advantageously be employed in the present invention. The olefinic monomers used include propylene, 1-butene, vinyl chloride, vinyl acetate, styrene, acrylonitrile, alkyl acrylate, alkyl methacrylate, and vinylidene chloride etc.

DESCRIPTION OF THE PREFERRED EMBODIMENTS

The present invention is further explained by way of Examples, but is not limited to them. It should be un-

EXAMPLE 1

About 70 ml of aqueous solution of sodium nitrite, air dissolved in which was replaced with ethylene containing oxygen not more than 0.4 ppm, was charged in a reaction vessel having an inside volume of 100 ml. Then the same species of ethylene was charged into 400 atmospheric pressure at 20° C. The reaction system was irradiated by gamma rays from Co-60 of absorption dose rate of $0.88 \times 10^5$ rad/hr for one hour.

Table 1 shows amounts of polyethylenes formed in aqueous solutions in which sodium nitrites are dissolved in various concentrations. The formation of polyethylene was zero when the concentration of sodium nitrite was not less than $6 \times 10^{-4}$ mol/l. Under the same conditions except that no sodium nitrite was dissolved, 0.65 g/l of polyethylene formed in the aqueous solution.

TABLE 1

Formation of Polyethylene against Concentration of Sodium Nitrite

| Sodium Nitrite concentration (mol/l) | Polyethylene formed in aqueous solution (g/l) |
|---|---|
| 0 | 0.65 |
| $1 \times 10^{-4}$ | 0.60 |
| $5 \times 10^{-4}$ | 0.08 |
| $6 \times 10^{-4}$ | 0.00 |
| $1 \times 10^{-3}$ | 0.00 |
| $2 \times 10^{-2}$ | 0.00 |

EXAMPLE 2

About 70 ml each of aqueous solution of the inhibitor specified in Table 2, air dissolved in which was replaced with ethylene containing oxygen not more than 0.4 ppm, was charged into a reaction vessel having an inside volume of 100 ml. The reaction vessel was charged with the same species of ethylene of 400 atmospheric pressure at 20° C. and was irradiated by gamma rays from Co-60 of absorption dose rate of $1.8 \times 10^5$ rad/hr for 30 minutes. Formation of polyethylene was zero in the aqueous phase as shown in Table 2.

TABLE 2

Formation of Polyethylene against Inhibitors

| Inhibitor | concentration of inhibitor (mol/l) | Yield of polyethylene in aqueous solution (g/l) | Yield of polyethylene in gaseous phase (g/l) |
|---|---|---|---|
| no inhibitor | control | 0.667 | 6.0 |
| $K_2Cr_2O_7$ | $2 \times 10^{-2}$ | 0.00 | 5.5 |
| $(NH_4)_2S_2O_8$ | " | almost zero | 5.0 |
| $KMnO_4$ | " | 0.00 | 5.3 |
| $KNO_3$ | " | 0.00 | 5.0 |
| $NaNO_2$ | " | 0.00 | 4.9 |
| $K_3Fe(CN)_6$ | " | 0.00 | 5.8 |
| $SnCl_4$ | " | 0.00 | 5.7 |
| $Na_2S_2O_3 \cdot 5H_2O$ | " | 0.00 | 5.4 |
| $Na_2S_2O_4$ | " | 0.00 | 4.8 |
| $H_3PO_4$ | * | 0.00 | 6.6 |
| $KH_2PO_4$ | $2 \times 10^{-2}$ | almost zero | 1.9 |
| $FeCl_3$ | $2 \times 10^{-2}$ | 0.00 | 5.5 |

* about 70 ml solution comprising; 3ml of conc. $H_3PO_4$ and water to make 100 ml.

EXAMPLE 3

Example 1 was repeated except that the concentration of sodium nitrite was $1.0 \times 10^{-2}$ mol, and the mixture of ethylene (70 mol percent) and its solvent 1,2-dichloro-1,1,2,2-tetrafluoroethane was charged to 400 atmospheric pressure at 20° C. No polymer formed in the aqueous solution phase. Under the same conditions when no sodium nitrite was added, 0.70 g/l of polymer formed in the aqueous solution.

EXAMPLE 4

Example 2 was repeated except that the inhibitors specified in Table 3 were employed. Table 3 shows that formation of polyethylene was remarkably decreased.

TABLE 3

Formation of Polyethylene against Inhibitors

| Inhibitor | concentration of inhibitor (mol/l) | Yield of polyethylene in aqueous solution (g/l) | Yield of polyethylene in gaseous phase (g/l) |
|---|---|---|---|
| No inhibitor | (control) | $0.66_7$ | 6.0 |
| NaCl | $2 \times 10^{-2}$ | $0.22_4$ | 5.5 |
| KBr | " | $0.16_0$ | 5.7 |
| KI | " | $0.20_0$ | 5.0 |
| $ZnCl_2$ | " | $0.29_8$ | 4.2 |
| $NH_4Cl$ | " | $0.28_7$ | 4.9 |
| $K_4Fe(CN)_6 \cdot 3H_2O$ | " | $0.30_9$ | 5.5 |
| $Na_2CO_3$ | " | $0.29_8$ | 4.0 |
| $MnSO_4$ | " | $0.27_1$ | 7.0 |
| $H_2SO_4$ | solution of conc. $H_2SO_4$ 2ml and water 70 ml | $0.18_5$ | 6.6 |
| HCOOH | solution of the acid 2ml and water 70 ml | almost zero | $4.3_5$ |
| $CH_3COOH$ | " | almost zero | 3.5 |

EXAMPLE 5

Into a reaction vessel of 100 ml inside volume was charged 10 ml of methyl methacrylate (purified by removing polymerization inhibitor) and replaced air dissolved with ethylene containing oxygen not more than 1 ppm by repeating compression (to 20 atmospheric pressure of ethylene) and decompression. About 60 ml of aqueous solution of sodium nitrites ($1.0 \times 10^{-2}$ mol/l) was introduced into the vessel after replacing air dissolved in the solution with said ethylene. Then the same species of ethylene was charged to 400 atmospheric pressure at 20° C., and the system was irradiated with gamma rays from Co-60 of absorption dose rate of $0.88 \times 10^5$ rad/hr for one hour.

No polymer formed in the aqueous solution phase. Under the same conditions, when no sodium nitrite was added, 0.50 g/l of polymer formed in the aqueous solution.

What is claimed is:

1. In a process for effecting polymerization by means of an ionizing radiation in the mixed phase system comprising polymerizable monomer phase consisting of ethylene, mixture of ethylene and another unsubstituted or substituted olefinic monomer or monomers, or a mixture of said polymerizable monomer or monomers and solvent therefor, and water or aqueous solution phase coexisting with said monomer phase; an improvement in inhibiting or decreasing formation of polymer in the aqueous phase, comprising adding a small amount of at least one inhibitor selected from the group consisting of (A) the electrolytes which have strong oxidizing action and release nascent oxygen in an ordinary chemical reaction condition selected from the group consisting of bichromates, permanganates and persulfates, and (B) the electrolytes which react at a high reaction rate with the active species such as H radicals, OH radicals and/or hydrated electrons that form in the aqueous phase by means of an ionizing radiation and are transformed into stable chemical species by reaction therewith selected from the group consisting of nitrates, nitrites, ferric-cyanates, ferrocyanates, ferric salts, stannic salts, thiosulfates, dithionates, alkalihalides, carbonates, phosphonic acid, sulfuric acid, lower organic carboxylic acids and salts of these acids, to said water or aqueous solution phase before initiating polymerization wherein said inhibitor or inhibitors is present in an amount of about $10^{-4}$–$10^{-1}$ mol per liter of water or aqueous solution.

2. A process as set forth in claim 1, in which the olefinic monomer is selected from an olefin other than ethylene, a vinyl compound monomer and the other substituted monomers of an olefin.

3. A process as set forth in claim 1, in which the olefinic monomer is selected from the group consisting of propylene, 1-butene, vinyl chloride, vinyl acetate, styrene, acrylonitrile, alkyl acrylate, alkyl methacrylate, and vinylidene chloride.

4. A process as set forth in claim 1, in which gamma rays, X rays, beta rays, electron beams, neutron beams, alpha rays or mixture thereof is employed.

5. A process as set forth in claim 1, in which the olefinic monomer is selected from an olefin other than ethylene, a vinyl compound monomer and the other substituted monomers of an olefin.

6. A process as set forth in claim 1, in which the olefinic monomer is selected from the group consisting of propylene, 1-butene, vinyl chloride, vinyl acetate, styrene, acrylonitrile, alkyl acrylate, alkyl methacrylate and vinylidene chloride.

7. The process of claim 1 wherein gamma-rays, X-rays, beta-rays, electron beams, neutron beams, alpha-rays, or mixtures thereof are employed.

* * * * *